(12) United States Patent
Hazeghi et al.

(10) Patent No.: US 11,625,191 B2
(45) Date of Patent: Apr. 11, 2023

(54) APPARATUSES, SYSTEMS, AND METHODS FOR HEATING A MEMORY DEVICE

(71) Applicant: Intel Corporation, Santa Clara, CA (US)

(72) Inventors: Arash Hazeghi, San Jose, CA (US); Pranav Kalavade, San Jose, CA (US); Rohit Shenoy, Fremont, CA (US); Krishna Parat, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 16/779,472

(22) Filed: Jan. 31, 2020

(65) Prior Publication Data

US 2021/0240388 A1  Aug. 5, 2021

(51) Int. Cl.
*G06F 3/06* (2006.01)
*G05B 19/406* (2006.01)

(52) U.S. Cl.
CPC ......... *G06F 3/0659* (2013.01); *G05B 19/406* (2013.01); *G06F 3/0619* (2013.01); *G06F 3/0679* (2013.01); *G05B 2219/50333* (2013.01)

(58) Field of Classification Search
CPC .... G06F 3/0659; G06F 3/0619; G06F 3/0679; G05B 19/406; G05B 2219/50333
See application file for complete search history.

(56) References Cited

U.S. PATENT DOCUMENTS

| | | | | |
|---|---|---|---|---|
| 9,865,570 | B1* | 1/2018 | England | H01L 21/561 |
| 10,013,734 | B1* | 7/2018 | Boles | G09G 5/363 |
| 2010/0246235 | A1* | 9/2010 | Gouin | G11C 7/12 |
| | | | | 365/72 |
| 2015/0043266 | A1* | 2/2015 | Youn | G11C 7/14 |
| | | | | 365/148 |
| 2015/0373876 | A1* | 12/2015 | Berke | G05B 15/02 |
| | | | | 700/282 |
| 2016/0162219 | A1* | 6/2016 | Erez | G11C 8/12 |
| | | | | 711/103 |
| 2017/0046079 | A1* | 2/2017 | Chinnakkonda Vidyapoornachary | G11C 11/40626 |
| 2019/0094927 | A1* | 3/2019 | Kuwano | G06F 3/0653 |
| 2020/0073592 | A1* | 3/2020 | Nishikawa | G06F 3/0683 |

\* cited by examiner

*Primary Examiner* — Charles Rones
*Assistant Examiner* — Han V Doan
(74) *Attorney, Agent, or Firm* — Schwabe, Williamson & Wyatt, P.C.

(57) ABSTRACT

An apparatus and/or system is described including a memory device or a controller for the memory device to perform heating of the memory device. In embodiments, a controller is to receive a temperature of the memory device and determine that the temperature is below a threshold temperature. In embodiments, the controller activates a heater for one or more memory die to assist the memory device in moving the temperature towards the threshold temperature, to assist the memory device when reading data. In embodiments, the heater comprises a plurality of conductive channels included in the one or more memory die or other on-board heater. Other embodiments are disclosed and claimed.

22 Claims, 7 Drawing Sheets

Example of heating pulses (ATC) directed to an idle die (Die 3) when Die 0-2 are in use

FIG. 6

Example of staggered heating pulses (ATC) between user commands when all dies are in use

APPARATUSES, SYSTEMS, AND METHODS FOR HEATING A MEMORY DEVICE

FIELD

Embodiments of the present disclosure generally relate to the field of integrated circuits (IC), and more particularly, to non-volatile memory devices.

BACKGROUND

Cross-Temperature ("Cross-Temp") is a major contributor to reliability degradation in memory arrays, in particular, NAND memory arrays. Cross-Temp refers to the phenomena of the reading of memory cells at a temperature different than the temperature at which the memory cells were programmed. In order to correctly read data stored in a NAND memory array, the memory device needs to have enough read window budget (RWB) to account for temperature differences as well as other effects, e.g., stringent or varying working conditions. Read window budget (RWB) refers to a voltage window that includes the difference between the read voltage level and an edge of a threshold voltage distribution corresponding to each programmed level being discriminated during a read operation. In some cases, more than half of the RWB for NAND memory arrays is allocated for Cross-Temp loss. Process improvements implemented to reduce the loss can be costly and time consuming.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In embodiments described herein, a memory device including a plurality of memory die or apparatus coupled to the memory device is configured to perform operations associated with heating (also referred to as active thermal compensation, "ATC" or "thermal compensation") of the memory device. As noted above, difficulties reading data can occur due to the reading of memory cells at a temperature different than the temperature at which the memory cells were written. For example, data may have been previously written to a memory device at a warm ambient temperature, however, later when read, the memory device may be at a cold ambient temperature. In other examples, data may have been previously written to a memory device at a cold ambient temperature and then later read at a warm ambient temperature. Thus, in embodiments, alleviating inaccuracies and reduced RWB related to memory operations include heating a memory device to move a current read temperature closer to a previous write temperature or move a current write temperature closer to a current (or future) read temperature. In embodiments, at a read operation time, the memory device may then be more accurately read because the write and the read temperatures of the memory device are within a reduced temperature range. Accordingly, in embodiments, a controller or other component associated with the memory device is configured to receive the temperature and determine that the temperature is below a threshold temperature, e.g., the memory device is at or near a cold ambient temperature. In embodiments, the heater is activated during or prior to a read or write operation in the memory device. In embodiments, the controller is to activate the heater by issuing a command to one or more memory die in the plurality, or to the heating device, to switch to a self-heating mode. In some embodiments, the heater includes conductive channels, e.g., a plurality of pillars included in the one or more memory die. In various other embodiments, the heater is any suitable on-board heater that raises a temperature of the memory die, such as a resistive heater that is in a proximity of or in contact with the memory die(s).

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

In some cases, various operations will be described as multiple discrete operations in turn, in a manner that is most helpful in understanding the present disclosure; however, the order of description should not be construed to imply that these operations are necessarily order dependent. In particular, these operations need not be performed in the order of presentation.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. Furthermore, it is to be understood that the various embodiments shown in the Figures ("FIGs.") are illustrative representations and are not necessarily drawn to scale.

Figure 1:
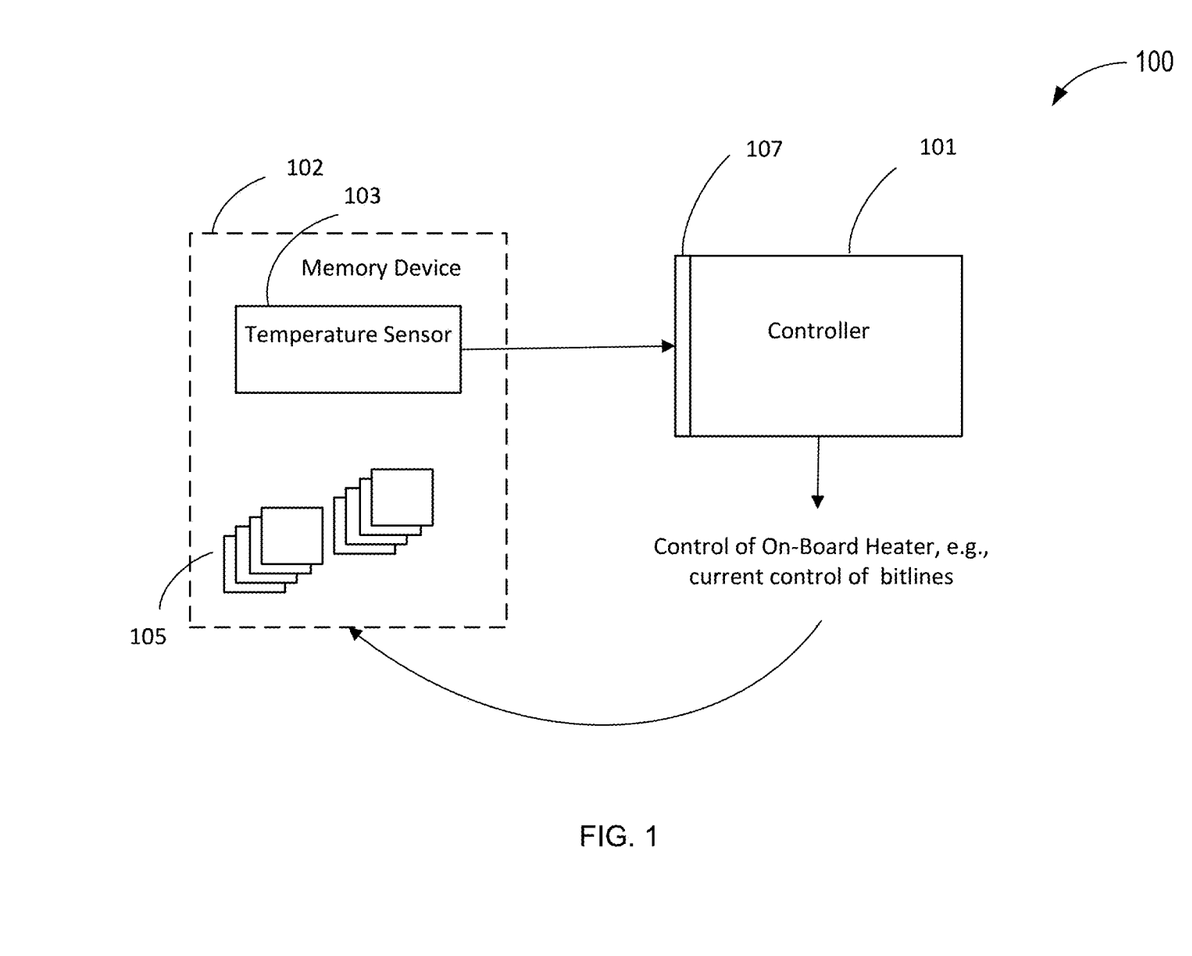
FIG. 1 is a block diagram illustrating an example environment in which a heater for a memory device may be provided, in accordance with embodiments of the present disclosure.

FIG. 1 is a block diagram illustrating an example environment 100 in which a heater for a memory device may be provided, in accordance with embodiments of the present disclosure. In some embodiments, the memory device resides at a cold ambient temperature. In embodiments, the heater is activated to move a read temperature of the memory device closer to a write temperature of the memory device and/or to move a write temperature of the memory device closer to a read temperature of the memory device. As shown, in embodiments, a memory controller or controller 101 includes an interface 107 to receive a temperature of a memory device 102 from a temperature sensor 103. In embodiments, memory device 102 includes a plurality of memory die (e.g., 105). In embodiments, as will be discussed in more detail with respect to FIGS. 3 and 4, controller 101 determines that the temperature is below a threshold temperature and applies active thermal compensation (ATC) by activating a heater, e.g., a memory die itself (e.g., one or more of memory die 105). In embodiments, control of the heater includes control of a plurality of bit lines to activate a plurality of conductive channels, e.g., pillars, in one or more memory die 105.

In embodiments, memory device 102 is a non-planar device (e.g., 3D) and includes a non-volatile memory device. In embodiments, the memory device 102 is a flash memory device, such as a NAND flash or a NOR flash memory device. In some embodiments, the memory device is a multilevel cell (MLC) memory device. The memory cells may be arranged in memory cell strings where memory cells of a given memory cell string share a common channel region, according to embodiments. In other words, the memory cells may be physically located in multiple levels of memory device 100, such that the memory cells in the same memory cell string may be stacked over each other in multiple levels of memory device 102, forming the conductive channels (also referred to as pillars (shown in further detail in FIG. 2)) that are to be activated at a similar or simultaneous time to heat the memory die.

Note that in embodiments, temperature sensor 103 includes circuitry to sense a temperature of memory cells included in one or more of memory die 105. In various embodiments, such circuitry includes or is coupled to complementary metal-oxide-semiconductor (CMOS) under array circuitry (schematically shown as 140 in FIG. 2).

Figure 2:
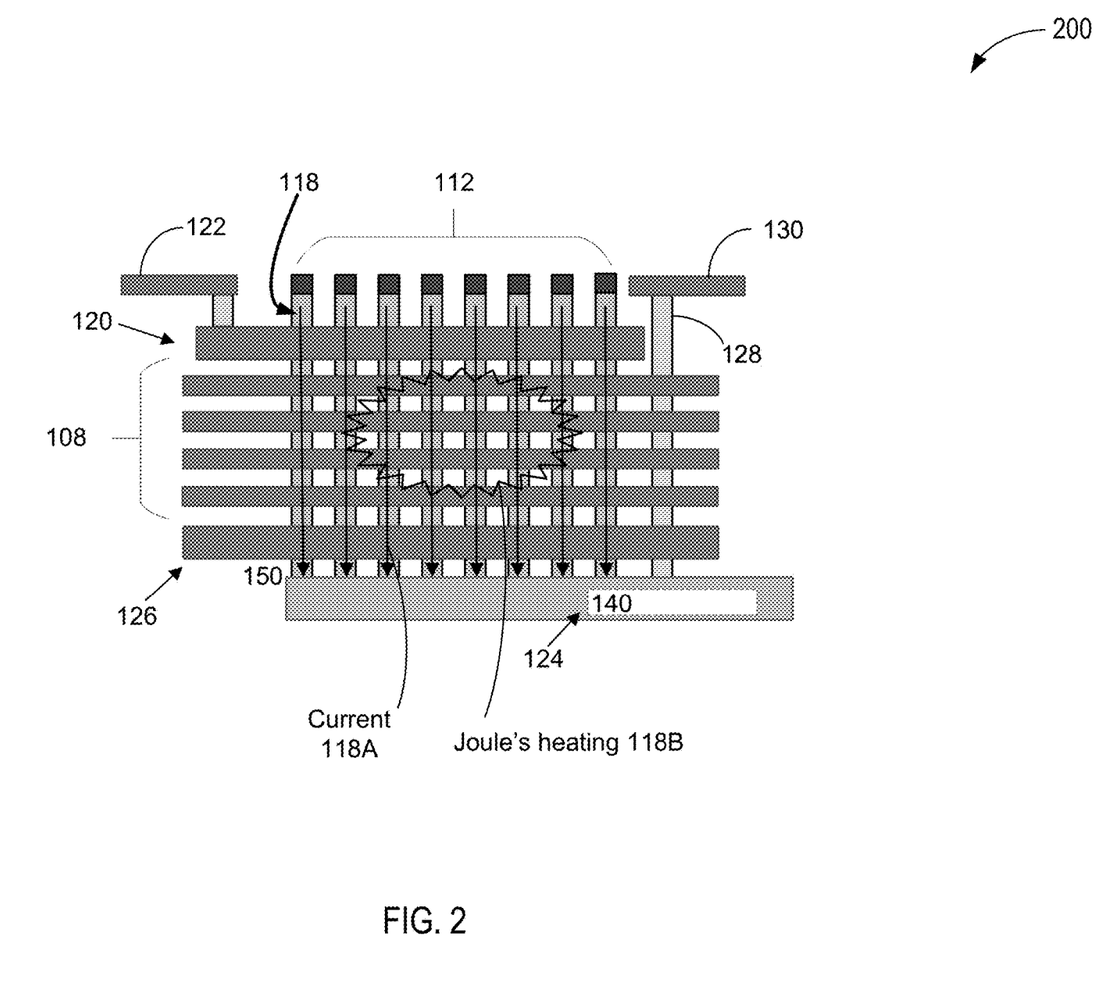
FIG. 2 is an example cross-section view of a portion of a memory device including conductive channels that may be activated to heat the memory device, in accordance with some embodiments.

To further illustrate, FIG. 2 is an example cross-section view of a portion of a memory device, e.g., memory device 102 of FIG. 1, illustrating the conductive channels, as discussed above. As shown, pillars or conductive channels 118 intersect or couple with wordlines 108, which may include multiple wordline tiers (not shown). For simplicity, only one of conductive channels 118 is labeled. In embodiments, each of conductive channels 118 is a pillar of semiconductor material (e.g., polysilicon) that forms a common channel region, shared by the wordlines, about which a string of charge storage devices are formed. Furthermore, as shown, in embodiments, the memory device includes data lines or bit-lines 112, a bit line selector 120, a common source line 124 with corresponding source line selector 126 and contacts 128 to provide electrical contacts for the wordline, source line, and source line selector connections 130, as shown. Note that wordlines 108, bit lines 112, and conductive channels 118 are shown in FIGS. 1-2 as an illustrative example only. The number of these lines may vary. Furthermore, in other embodiments (not shown) the wordlines may form staircases on respective left and right sides of the memory device 102.

In embodiments, controller 101 activates the heater by issuing a command to the one or more memory die to switch the one or more memory die to a self-heating mode. In embodiments, the self-heating mode includes activation of each of conductive channels 118 at a similar or simultaneous time that each of the other conductive channels 118 in the plurality are activated. In normal operation, memory device circuitry applies a combination of different voltage levels to selected bit lines or wordlines to perform to write and read operations. In embodiments, once the memory die is switched to self-heating mode, however, bit lines 112 are controlled to provide current to substantially all conductive channels 118 at a similar or simultaneous time. For example, in embodiments, bit line selector 120, and the source line selector 126, select all bit lines corresponding to all the conductive channels to induce current flow 118A that flow along conductive channels to the common source line 124. Accordingly, in embodiments, current flow 118A induces heating 118B, e.g., Ohmic heating or resistive heating i.e., Joule's heating, to heat the memory die. In embodiments, activation of pillars or conductive channels 118 may include increasing a plurality of bit-line pre-charge currents to maximum or substantially maximum levels. In embodiments, power utilized for activation of conductive channels 118 remains within allocated power for the memory device (e.g., power envelope).

One of ordinary skill in the art may recognize that memory device 102 may include other elements, several of which are not shown in FIG. 1, so as not to obscure the example embodiments described herein. Note that in some other embodiments, the bit lines and wordlines may be configured such that each of the memory elements may be disposed at an intersection of each individual bit-line and wordline, in a cross-point configuration.

Figure 3:
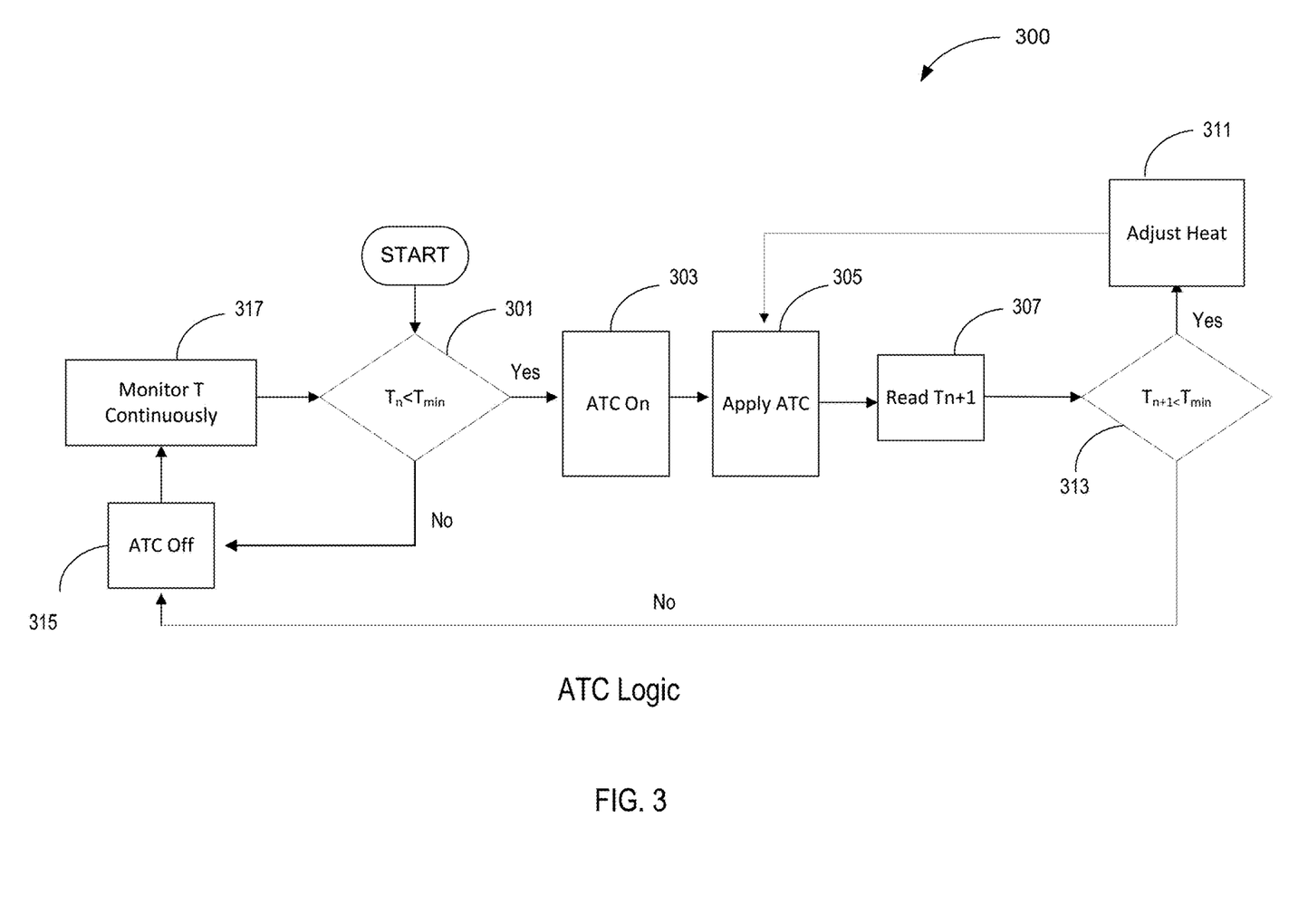
FIG. 3 is a flow diagram illustrating an example process to monitor and adjust thermal compensation for a memory device, according to embodiments of the disclosure.

FIG. 3 is a flow diagram illustrating an example process 300 that is performed by, e.g., a controller (e.g., controller 101 of FIG. 1), to monitor and adjust thermal compensation for a memory device (e.g., memory device 102 of FIG. 1), in accordance with various embodiments. In embodiments, the controller includes firmware or a combination of firmware and circuitry to perform process 300. In an embodiment, after a start block, at a block 301, the controller receives a temperature of the memory device from a temperature sensor and checks the condition, $T_n<T_{min}$. In embodiments, $T_n$ is a temperature of the memory device (e.g., at an $n_{th}$ heating cycle or loop) and $T_{min}$ is a threshold temperature. In embodiments, the threshold temperature has been pre-determined or determined actively based on read and write operating parameters of the memory device. If the answer at block 301 is Yes, in embodiments, the controller determines at block 303 that thermal compensation for the memory device should be activated. In embodiments, (discussed further with respect to FIG. 5), the controller is to determine which memory die is to switch to the self-heating mode based on which memory die out of the plurality of memory die is currently being accessed or is less likely to be accessed by a user.

At block 305, the controller applies thermal compensation by issuing a command to the one or more memory die in the plurality to switch the one or more memory die to a self-heating mode. At a next block 307, the controller reads the temperature for the next heating loop ($T_{n+1}$) as provided by the temperature sensor. At block 313, the controller checks the condition $T_{n+1}<T_{min}$. If, in embodiments, the answer is Yes, the controller will then continue the application of thermal compensation and adjust the heat at box 311. If, in embodiments, the answer to the condition $T_{n+1}<T_{min}$ is No, the memory device is no longer at or below the threshold minimum temperature. Accordingly, the thermal compensation is turned off at box 315. In embodiments, the heating device (e.g., the conductive channels in the memory die or in other embodiments, a resistive heater) is turned off. At box 317, the controller continues to monitor the temperature, T, of the memory device by checking the condition $T_{n+1}<T_{min}$ at box 301 and looping through process 300 as needed to provide thermal compensation to the memory device.

Figure 4:
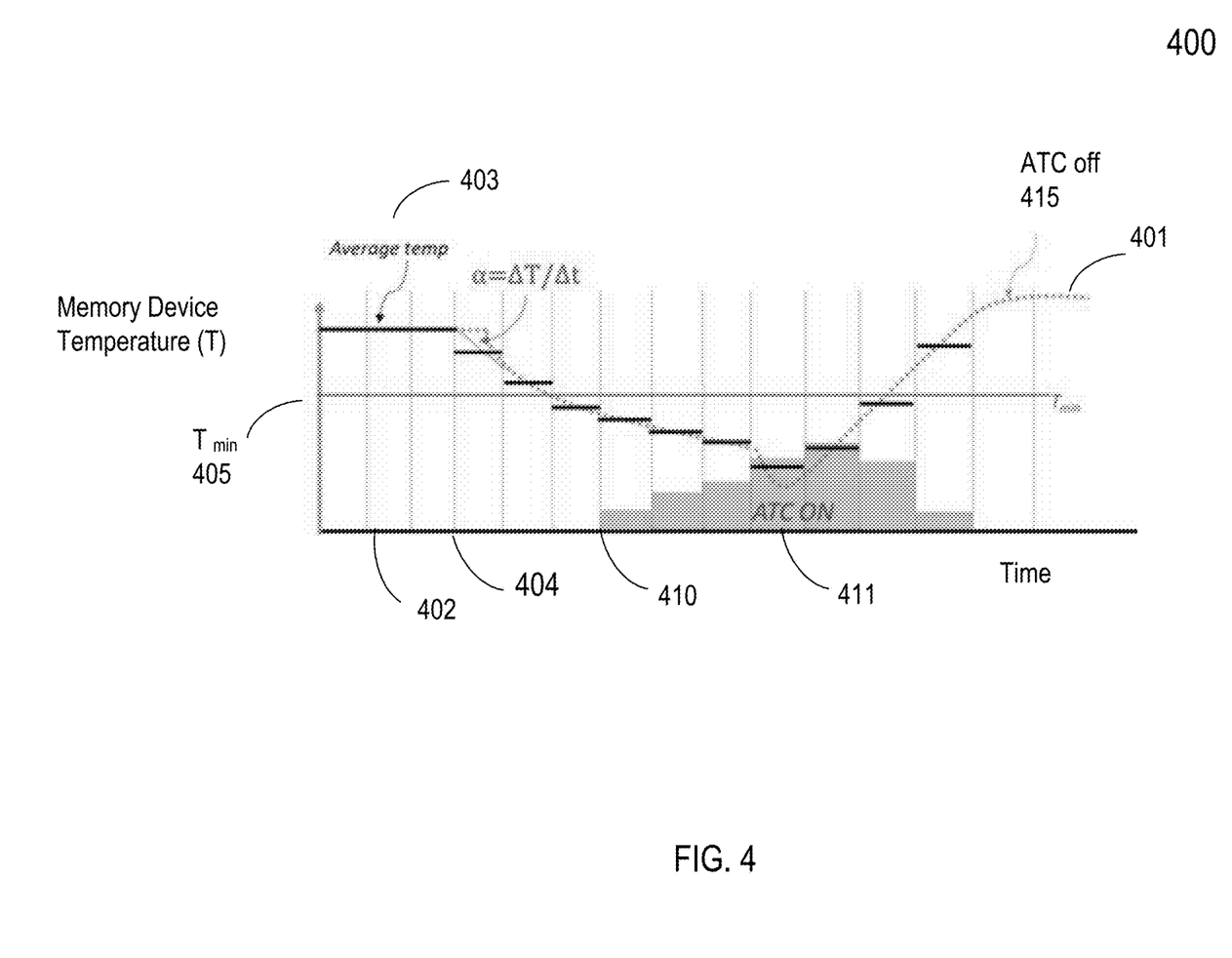
FIG. 4 is an example graph illustrating the effect of thermal compensation on memory device temperature, according to embodiments of the disclosure.

FIG. 4 is an example graph illustrating the effect of thermal compensation on memory device temperature, according to embodiments of the disclosure. As shown, the vertical axis depicts memory device temperature and the horizontal axis depicts time. As shown, vertical markers 402 (for simplicity, only one marker 402 is labeled) along the time axis are representative of temperature read-out buckets spaced at intervals (e.g., 5 seconds or other suitable interval). In embodiments, as shown at 403, a memory device may reside at an average temperature (e.g., 70 degrees) for a period of time, until an environmental or other change causes its temperature, T, to begin to drop at a time, e.g., 404. In embodiments, controller (e.g., controller 101) is coupled to receive temperature T from a temperature sensor (e.g., temperature sensor 103 of FIG. 1) and determine that the temperature is below a threshold temperature, e.g., $T_{min}$ (405).

Accordingly, the controller activates a heater by issuing a command to the one or more memory die in the plurality to switch the one or more memory die to a self-heating mode. In embodiments, the controller issues a command and ATC is activated at 410. Thus, as shown in FIG. 4, waveform 401 begins to rise as memory device temperature rises (e.g., at approximately 411). At 415, the controller determines that memory device temperature has been raised sufficiently and deactivates the ATC. In some embodiments the controller issues a command to deactivate the ATC (e.g., self-heating mode) once the temperature reaches an upper threshold. In a similar or the same embodiment, the controller 101 at least partially bases its determination of whether to activate or deactivate ATC on a rate of change in temperature, e.g., $\alpha=\Delta T/\Delta t$, to determine how quickly T is dropping or rising. The green bars starting at 410 show possible heating strength values that are calculated by the controller in each loop.

Figure 5:
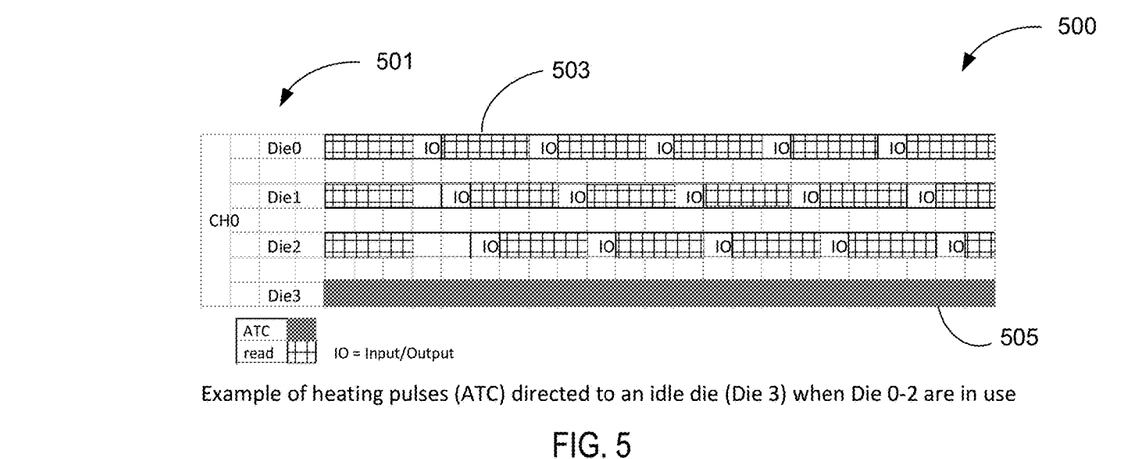
FIG. 5 illustrates an example application of heating pulses to an idle memory die when other memory die are in use, in accordance with embodiments of the present disclosure.
Figure 6:
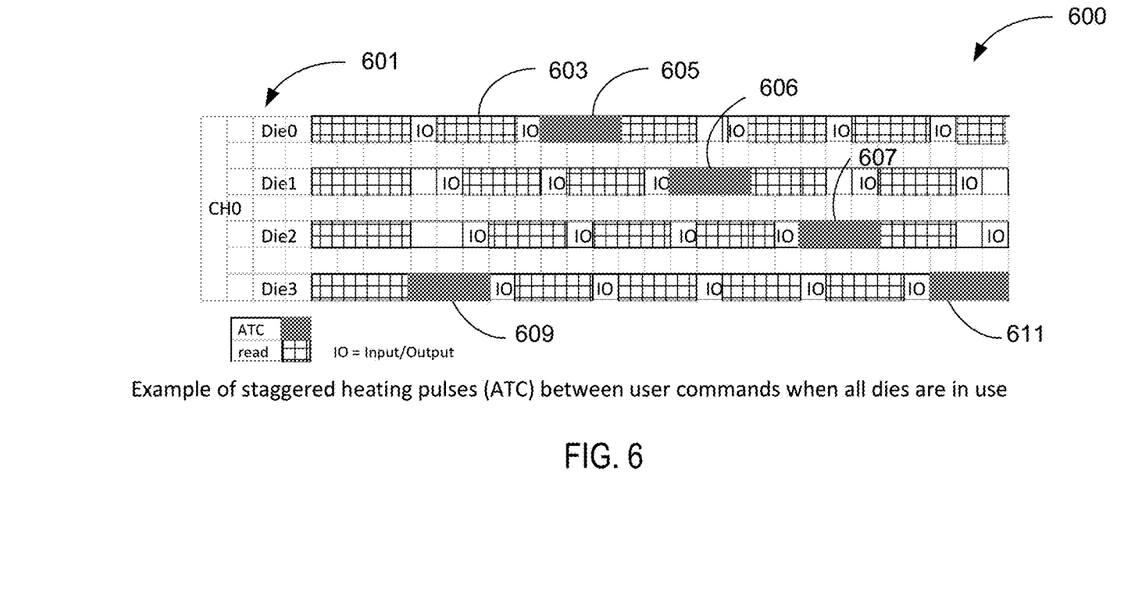
FIG. 6 illustrates an example application of heating pulses to a plurality of memory die when substantially each of the plurality of memory die are in use, in accordance with embodiments of the present disclosure FIG. 7 a schematic of a computing system, in accordance with embodiments of the present disclosure.

FIG. 5 and FIG. 6 illustrate example distributions of heating pulses associated with heating one or more memory die of the memory device, in accordance with embodiments of the disclosure. In embodiments, a heating pulse represents simultaneous or near-simultaneous activation of a plurality of conductive channels (e.g., pillars) in a memory die (as described above in connection with e.g., FIGS. 3 and 4). FIG. 5 illustrates application of heating pulses to an idle memory die when other memory dies of a plurality (e.g., of the memory device or SSD) are in use, in an embodiment. The controller (e.g., solid-state drive (SSD) controller) determines or selects which particular memory die ("Die") is to switch to a self-heating mode (e.g., activation of (to heat the memory die) based on which memory die out of the plurality of memory die is less likely to be accessed or is not currently being accessed by a user.

Diagram 500 represents a channel 0 where the controller has access to Die 0-Die 3, as shown in column 501. In the embodiment, Die 0-Die 2 are being accessed by the controller in response to user commands, as indicated by application of read voltage levels or read pulses 503 (for clarity, only one read pulse 503 is labeled. Additional read pulses are indicated by hatched shading). Accordingly, the controller selects Die 3 (which is idle) to activate a self-heating mode as illustrated by plurality of heating pulses 505 (solid shading).

Note that particular memory die, in an SSD, for example, are defective or for various reasons, may no longer work. Accordingly, such die, e.g., retired, defective, or rejected die, can be utilized to heat surrounding memory die. In embodiments, such die can be converted permanently to self-heating die and are selected by the controller when heating pulses are to be applied. Accordingly, in embodiments, similar to the die as described in connection with FIG. 2, all conductive channels of the retired, defective, or rejected die may be activated during heating.

FIG. 6 illustrates an embodiment where staggered heating pulses are applied to one or more particular memory die. In embodiments, as instructed by the controller, the memory device applies the staggered heating pulses between application of read voltage levels associated with user commands. As shown in column 601, the controller has access to Die 0-Die 3 via channel 0. In the embodiment, each of the Die, e.g., Die 0-Die 3 is being accessed by the controller, as indicated by application of read voltage levels or read pulses 503 (for clarity in the FIG., only read pulse 503 is labeled but are indicated by hatched shading). As shown, the controller applies successive heating pulses staggered among Dies 0-3. In embodiments, the controller applies a heating pulse 605 between a plurality of read pulses for Die 0, a heating pulse 606 between a plurality of read pulses for Die 1, a heating pulse 606 between a plurality of read pulses for Die 1, a heating pulse 607 between a plurality of read pulses for Die 2, and heating pulses 609 and 611 between a plurality of read pulses for Die 3.

It is understood that FIGS. 5 and 6 are merely examples and that a number of dies associated with a channel will vary as well as a pattern of application of heating pulses and/or reading (or write) pulses. In embodiments, the pattern of application of heating pulses and/or reading (or write) pulses will vary according to a pattern of access to particular memory die and/or power considerations. Furthermore, the application of heating pulses may or may not be associated with activation of conductive channels but may be associated with any other suitable application of heat by other suitable on-board or in-memory device heater.

Figure 7:
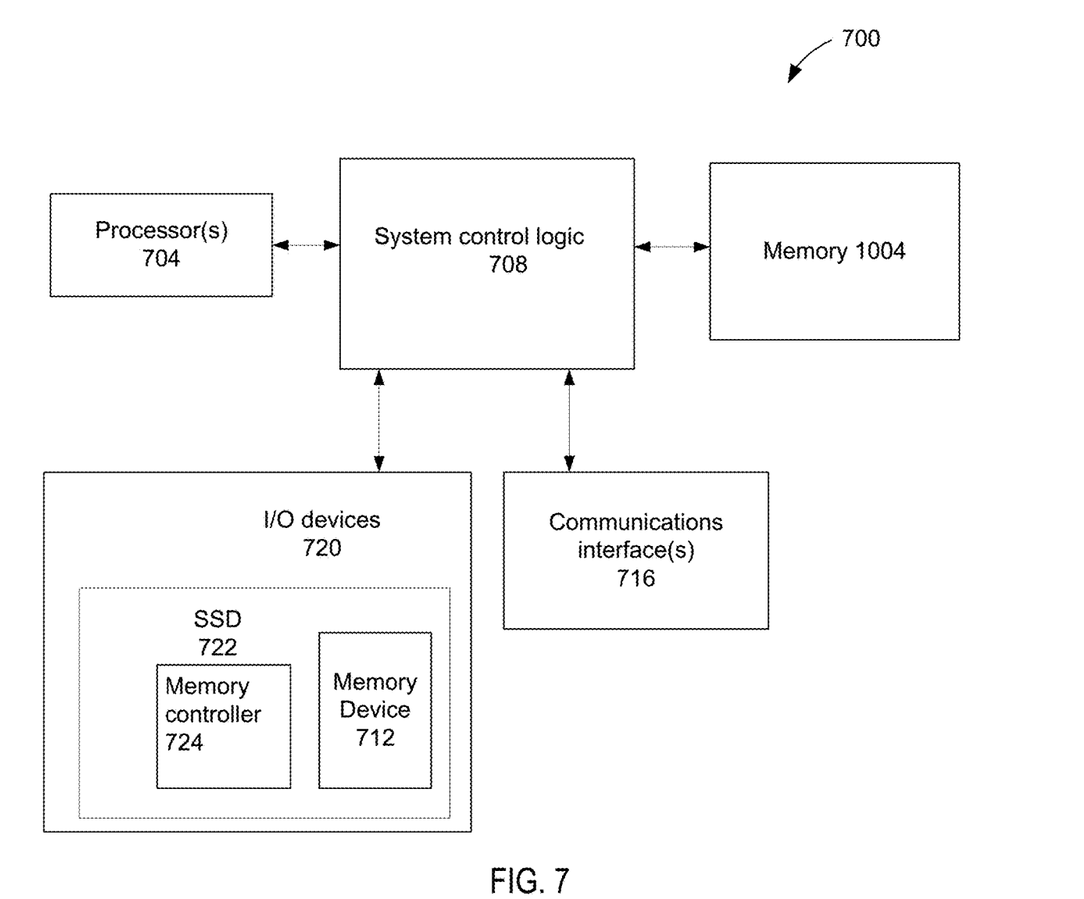

FIG. 7 schematically illustrates an example computing device including a memory device and/or a memory device controller that may implement heating of the memory device via thermal compensation as described in connection with FIGS. 1-6 above.

The computing device 700 includes system control logic 708 coupled to one or more processor(s) 704; system memory 1004; input/output (I/O) devices 720 such as an SSD 722 (e.g., see FIG. 8) including a memory device 102 described in reference to FIGS. 1-6; and one or more communications interface(s) 716.

In embodiments, SSD 722 may include a memory device 712 and a memory controller 724, similar to memory device 102 and a memory controller 101, associated with FIGS. 1-7. In embodiments, the memory device 712 comprises one or more package(s), such as an IC assembly having the memory device 712 disposed therein, driver circuitry (e.g., drivers), input/output connections to electrically couple the memory 712 with other components of the SSD, etc. The SSD 722 may be configured to be removably or permanently coupled with the computing device 700. In embodiments, system memory 1004 may be any one of a number of volatile storage known in the art.

In some embodiments, a memory device 712 may include an NVM device, e.g., a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Communications interface(s) 716 may provide an interface for computing device 700 to communicate over one or more network(s) and/or with any other suitable device. Communications interface(s) 716 may include any suitable hardware and/or firmware. Communications interface(s) 716 for one embodiment may include, for example, a network adapter, a wireless network adapter, a telephone modem, and/or a wireless modem. For wireless communications, communications interface(s) 716 for one embodiment may use one or more antennas to communicatively couple the computing device 700 with a wireless network.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

System control logic 708 for one embodiment may include any suitable interface controllers to provide for any suitable interface to at least one of the processor(s) 704 and/or to any suitable device or component in communication with system control logic 708. The system control logic 708 may move data into and/or out of the various components of the computing device 700.

In various embodiments, the I/O devices 720 may include user interfaces designed to enable user interaction with the computing device 700, peripheral component interfaces designed to enable peripheral component interaction with the computing device 700, and/or sensors designed to determine environmental conditions and/or location information related to the computing device 700. As shown, in embodiments, I/O devices 720 also includes, e.g., SSD 722. In various embodiments, the user interfaces could include, but are not limited to, a display, e.g., a liquid crystal display, a touch screen display, etc., a speaker, a microphone, one or more digital cameras to capture pictures and/or video, a flashlight (e.g., a light emitting diode flash), and a keyboard. In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may additionally/alternatively be part of, or interact with, the communication interface(s) 716 to communicate with components of a positioning network, e.g., a global positioning system (GPS) satellite.

In various embodiments, the computing device 700 may include a display and may be a mobile computing device such as, but not limited to, a laptop computing device, a tablet computing device, a netbook, a smartphone, etc.; a desktop computing device; a workstation; a server; etc. The computing device 700 may have more or fewer components, and/or different architectures. In further implementations, the computing device 700 may be any other electronic device that processes data.

Figure 8:
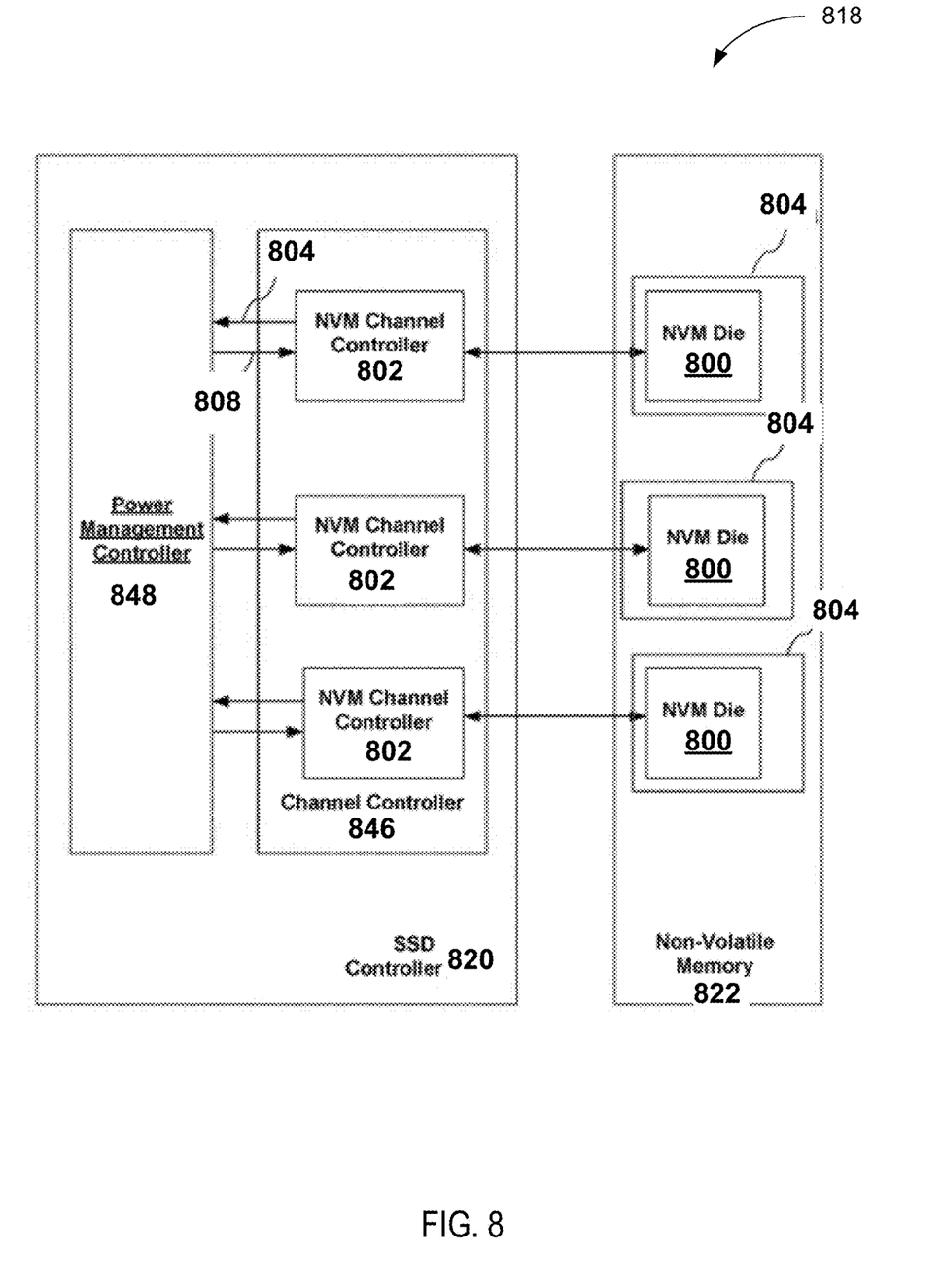
FIG. 8 a schematic of a solid-state drive (SSD), in accordance with embodiments of the present disclosure.

FIG. 8 is a block diagram of an example SSD 818, similar or the same as the SSD 722 shown in FIG. 7. As discussed in conjunction with FIG. 7, the SSD 818 includes a controller, e.g., SSD controller 820 and memory or non-volatile memory 822. In an embodiment, the non-volatile memory 822 includes a plurality of non-volatile memory (NVM) dies 800. In embodiments, SSD controller 820 implements the logic as described in connection with FIG. 3 to heat, e.g., one or more of the NVM dies 800. In embodiments, SSD 818 is communicatively coupled over bus to an I/O adapter (not shown) using the NVMe (NVM Express) over PCIe (Peripheral Component Interconnect Express) protocol. The SSD controller 820 includes the power management controller 848 and a channel controller 846. The channel controller 846 includes a NVM channel controller 802 per NVM channel 804. Each NVM channel 804 includes a plurality of NVM dies 800.

A NVMe read command received by the host interface 828 in the SSD 818 includes a logical address. The SSD Controller 820 includes a logical-to-physical address mapping table. A task (also referred to as a command) issued to the NVM channel controller 802 includes the physical address for the read command corresponding to the logical address in the NVMe read command that is retrieved from the logical-to-physical mapping table. Each NVM channel controller 802 in the channel controller 846 queues and processes commands for NVM dies 800. The SSD controller 820 may initiate a command to read data stored in NVM dies 800, write data ("write data" may also be referred to as "program") to NVM dies 800 and erase data stored in NVM dies 800.

In embodiments, the SSD memory device (e.g., see FIG. 8) is any suitable SSD that includes memory die that may be activated for heating to assist in reading and writing data, e.g., such as a consumer SSD, enterprise SSD, PCI-e (Peripheral Component Interconnect Express) SSD, and the like.

Note that in some other embodiments (not shown), a heater is any suitable on-board heater that raises a temperature of the memory die, such as a resistive heater that is in a proximity of or in contact with the memory die(s). Thus, in other embodiments, the heater may be external to a memory device. In embodiments, the heater is or includes any suitable heating element to heat proximal memory die, e.g., heating elements made of any metal, ceramic and semiconductor, thick film heaters, polymer heating elements, composite heating elements, and the like, may be used. In some embodiments, a copper heat sink with a dual purpose may be used to raise the temperature of memory die that are proximal to the heater or heating element.

According to various embodiments, the present disclosure describes a number of examples.

Example 1 is an SSD, comprising an interface to receive a temperature of a memory device, wherein the memory device includes a plurality of memory die; and a controller for the memory device, wherein the controller is coupled to the interface to receive the temperature and to determine that the temperature is below a threshold temperature and to activate a heater for one or more of the plurality of memory die to move a temperature of the memory device closer to the threshold temperature.

Example 2 is the SSD of Example 1, wherein to move the temperature of the memory device closer to the threshold temperature includes to move a temperature of the memory device from a cold ambient temperature to a warm ambient temperature Example 3 is the SSD of Example 1, wherein the controller is to activate the heater by issuing a command to the one or more memory die of the plurality to switch the one or more memory die to a self-heating mode.

Example 4 is the SSD of Example 3 wherein the heater comprises a plurality of conductive channels included in the one or more memory die.

Example 5 is the SSD of Example 1, wherein the conductive channels include pillars of a 3D-NAND memory die and wherein activation of the heater includes activation of substantially all of the pillars in the 3D-NAND memory die by increasing a plurality of bit-line pre-charge currents to maximum or substantially maximum levels.

Example 6 is the SSD of Example 2, wherein the controller is to determine which memory die is to switch to the self-heating mode based on which memory die out of the plurality of memory die is less likely to be accessed by a user.

Example 7 is the SSD of Example 2, wherein the controller is further to monitor the one or more memory die that is in the self-heating mode and is to issue a command to deactivate the self-heating mode once the temperature reaches an upper threshold.

Example 8 is the SSD of Example 7, wherein to deactivate the self-heating mode includes to turn all bit lines in the one or more memory die off.

Example 9 is a method, comprising receiving, by a memory controller, a temperature of a memory device; determining, by the memory controller, that the temperature is below a threshold temperature; and activating, by the memory controller, a heater for one or more of a plurality of memory die to assist the memory device in reading data by moving a temperature of the memory device closer to the threshold temperature Example 10 is the method of Example 9, wherein activating, by the memory controller, the heater, includes issuing a command to the one or more of the plurality of memory die to switch the one or more memory die to a self-heating mode.

Example 11 is the method of Example 9, wherein the heater comprises a conductive channels included in the one or more memory die.

Example 12 is the method of Example 11, wherein the conductive channels include pillars and the self-heating mode includes an activation of substantially all pillars in the plurality of pillars in the one or more memory die.

Example 13 is the method of Example 12, wherein the activation of substantially all the pillars includes increasing a plurality of bit-line pre-charge currents to maximum or substantially maximum levels.

Example 14 is the method of Example 12, further comprising monitoring, by the controller, the one or more memory die that is in a self-heating mode and issuing a command to deactivate the self-heating mode once the temperature reaches an upper threshold.

Example 16 is an apparatus comprising means to perform a method as claimed in any of Examples 9-14.

Example 17 is a system, comprising: a memory device; a controller coupled to the memory device, wherein the controller is to: receive a temperature of the memory device; determine that the temperature is below a threshold temperature; and activate a heater for one or more of a plurality of memory die of the memory device to assist the memory device in reading data from one or more of the plurality of memory die by moving a read temperature of the memory device closer to a write temperature of the memory device or by moving a write temperature of the memory device closer to a read temperature of the memory device, to assist the memory device when reading data.

Example 18 is the system of Example 17, wherein the controller is to activate the heater by issuing a command to the one or more memory die in the plurality to switch the one or more memory die to a self-heating mode Example 19 is the system of Example 17, wherein the heater comprises a plurality of conductive channels included in the one or more memory die.

Example 20 is the system of Example 17, wherein the memory device includes a multi-level cell (MLC) non-volatile memory device Example 21 is the system of Example 17, wherein the memory device comprises a 3D NAND solid-state memory device.

Example 22 is the system of Example 17, wherein the memory device includes one or more byte-addressable persistent memory devices.

Example 23 is a machine-readable storage medium including machine-readable instructions, when executed, to implement a method or realize an apparatus or system as set forth in any preceding Example.

Example 24 is a system, comprising: a processor; a solid-state drive (SSD) coupled with the processor, wherein the SSD includes: a memory device; and a memory controller coupled to the memory device, wherein the memory controller is to: receive a temperature of the memory device; determine that the temperature is below a threshold temperature; and activate a heater for one or more of a plurality of memory die of the memory device to assist the memory device in reading data from one or more of the plurality of memory die by moving a temperature of the memory device closer to the threshold temperature.

Example 25 is the system of Example 24, wherein the memory device comprises a 3D NAND memory device.

Example 26 is the system of Example 24, wherein the controller is to activate the heater by issuing a command to the one or more memory die of the plurality to switch the one or more memory die to a self-heating mode.

Example 27 is the system of any one of Examples 24-26, wherein the heater comprises a plurality of conductive channels included in the one or more memory die.

Example 28 is a computing system, comprising: a memory device; a controller coupled to the memory device, wherein the controller is to: receive a temperature of the memory device; determine that the temperature is below a threshold temperature; and activate a heater for one or more of a plurality of memory die of the memory device to assist the memory device in reading data from one or more of the plurality of memory die by moving a temperature of the memory device closer to the threshold temperature; and a display, communicatively coupled to a processor to display data stored in the memory device.

Example 29 is the computing system of Example 28, wherein the controller is to activate the heater by issuing a command to the one or more memory die in the plurality to switch the one or more memory die to a self-heating mode.

Example 30 is the computing system of Example 28, wherein the heater comprises a plurality of conductive channels included in the one or more memory die.

Example 31 is the computing system of Example 28, wherein the heater is a heater external to the memory device.

Various embodiments may include any suitable combination of the above-described embodiments, including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to specific implementations disclosed in the specification and the claims. Rather, the scope is to be determined entirely by the following claims, which are to be construed in accordance with established doctrines of claim interpretation.

What is claimed is:

1. A solid-state drive (SSD), comprising:
   a memory device, wherein the memory device includes a plurality of memory die; and
   a controller coupled to the memory device, wherein the controller is to:
   receive an indication of a temperature of the memory device;
   determine that the temperature of the memory device is below a threshold temperature;
   identify a memory die of the plurality of memory die, wherein the identification is based on an identification that the memory die is unusable for a future read or write operation; and
   activate substantially all bit-lines of the memory die by increasing a plurality of bit-line pre-charge currents to move the temperature of the memory device closer to the threshold temperature.

2. The SSD of claim 1, wherein to move the temperature of the memory device closer to the threshold temperature includes to move the temperature of the memory device from a cold ambient temperature to a warm ambient temperature.

3. The SSD of claim 1, wherein the controller is to activate the substantially all bit-lines by issuing a command to the one or more memory die of the plurality to switch the one or more memory die to a self-heating mode.

4. The SSD of claim 3, wherein the controller is further to:
   issue a command to deactivate the substantially all bit-lines once the temperature reaches an upper threshold.

5. The SSD of claim 4, wherein to deactivate the self-heating mode includes to turn the substantially all bit lines in the memory die off.

6. The SSD of claim 1, wherein the identification that the memory die is unusable for a future read or write operation is based on an identification that the memory die is retired.

7. A method, comprising:
   receiving, by a memory controller, an indication of a temperature of a memory device;
   determining, by the memory controller, that the temperature of the memory device is below a threshold temperature;
   identifying, by the memory controller, a memory die of a plurality of memory die of the memory device, wherein identifying the memory die is based on identifying which memory die of the plurality of memory die is unusable for a future read or write operation; and
   activating, by the memory controller, a heater for the memory die to assist the memory device in reading data by moving the temperature of the memory device closer to the threshold temperature.

8. The method of claim 7, wherein activating, by the memory controller, the heater, includes issuing a command to the memory die to switch the memory die to a self-heating mode.

9. The method of claim 7, wherein the heater comprises one or more conductive channels included in the memory die.

10. The method of claim 9, wherein the conductive channels include a plurality of pillars, and the self-heating mode includes an activation of substantially all pillars in the plurality of pillars in the memory die.

11. The method of claim 10, wherein the activation of substantially all the pillars includes increasing a plurality of bit-line pre-charge currents.

12. The method of claim 7, wherein activating, by the memory controller, the heater includes moving a read temperature of the memory device closer to a previous write temperature of the memory device or moving a write temperature of the memory device closer to a read temperature of the memory device.

13. The method of claim 7, wherein identifying which memory die of the plurality of memory die is unusable for a future read or write operation is based on identifying a memory die that is defective.

14. A system, comprising:
a processor; and
a solid-state drive (SSD) coupled with the processor, wherein the SSD includes:
a memory device that includes a plurality of memory die; and
a memory controller coupled to the memory device, wherein the memory controller is to:
identify a temperature of the memory device;
determine that the temperature of the memory device is below a threshold temperature;
identify a memory die of the plurality of memory die, wherein the identification is based on an identification that the memory die is unusable for a future read or write operation; and
activate substantially all bit-lines of the memory die by increasing a plurality of bit-line pre-charge currents to move the temperature of the memory device closer to the threshold temperature.

15. The system of claim 14, wherein the memory device is a 3D NAND memory device.

16. The system of claim 14, wherein the controller is to activate the substantially all bit-lines by issuing a command to the memory die to switch the memory die to a self-heating mode.

17. The system of claim 14, wherein the memory controller is to identify that the memory die is unusable for a future read or write operation based on an identification that the memory die is rejected.

18. A computing system, comprising:
a memory device that includes a plurality of memory die;
a controller coupled to the memory device, wherein the controller is to:
identify a temperature of the memory device;
determine that the temperature of the memory device is below a threshold temperature;
identify a memory die of the plurality of memory die based on an identification of which memory die of the plurality of memory die is unusable for a future read or write operation; and
activate a heater for the memory die to assist the memory device in reading data from one or more of the plurality of memory die by moving a temperature of the memory device closer to the threshold temperature; and
a display, communicatively coupled to a processor to display data stored in the memory device.

19. The computing system of claim 18, wherein the controller is to activate the heater by issuing a command to the memory die to switch the memory die to a self-heating mode.

20. The computing system of claim 18, wherein the heater comprises a plurality of conductive channels included in the memory die.

21. The computing system of claim 18, wherein the heater is a heater external to the memory device.

22. The computing system of claim 18, wherein identifying which memory die of the plurality of memory die is unusable for a future read or write operation is based on identifying which die of the plurality of memory die is retired, defective, or rejected.

* * * * *